United States Patent
Rives et al.

(10) Patent No.: US 6,771,715 B1
(45) Date of Patent: Aug. 3, 2004

(54) DEMODULATOR USING CORDIC ROTATOR-BASED DIGITAL PHASE LOCKED LOOP FOR CARRIER FREQUENCY CORRECTION

(75) Inventors: Eric M. Rives, Hampton Cove, AL (US); Matthew F. Gann, Madison, AL (US); Anthony A. Goodloe, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 09/538,673

(22) Filed: Mar. 30, 2000

(51) Int. Cl.[7] .............................. H03D 3/18; H03D 3/24
(52) U.S. Cl. .................... 375/327; 375/373; 375/376
(58) Field of Search ................................ 375/326, 327, 375/371, 372, 373, 374, 375, 376; 329/358

(56) References Cited

U.S. PATENT DOCUMENTS 6,151,368 A * 11/2000 Cochran ..................... 375/326

* cited by examiner

*Primary Examiner*—Stephen Chin
*Assistant Examiner*—Curtis Odom
(74) *Attorney, Agent, or Firm*—Allen, Dyer, Doppelt, Milbrath & Gilchrist, P.A.

(57) ABSTRACT

A digital data demodulator employs a cordic rotator-based, digital phase locked loop for carrier frequency tracking. Digitized I and Q channels downconverted to baseband using a fixed frequency oscillator are coupled to a digital cordic rotator. The cordic rotator iteratively executes pipelined phase-rotational adjustments of its digitized in-phase and quadrature inputs, in association with a pipelined reduction of the accumulated value of a phase angle vector code generated by digital phase error detection logic circuitry to which rotated I and Q outputs of the cordic rotator are applied. The phase error representative code vector is coupled through a digital loop filter as a reference angle input to the cordic rotator. The cordic rotator iteratively rotates the I and Q channel values that reduce the accumulated phase error to zero.

2 Claims, 3 Drawing Sheets

DEMODULATOR USING CORDIC ROTATOR-BASED DIGITAL PHASE LOCKED LOOP FOR CARRIER FREQUENCY CORRECTION

FIELD OF THE INVENTION

The present invention relates in general to communication systems, and is particularly directed to a digital data demodulator architecture, that employs a cordic rotator-based, digital phase locked loop for carrier frequency acquisition and tracking.

BACKGROUND OF THE INVENTION

The radio frequency (RF) and intermediate frequency (IF) stages of conventional radio subsystems (including those which employ digital signal processing components), such as but not limited to modulator and demodulator stages, typically employ both fixed frequency and voltage controlled crystal oscillators as part of their frequency conversion stages (mixers) and phase locked loop circuits. A conventional phase locked loop for a demodulation stage of a conventional "digital" radio for demodulating a spread spectrum-modulated QPSK signal, as a non-limiting example, is diagrammatically illustrated in FIG. 1 as having an input port 10, to which an incoming signal to be demodulated is applied. Input port 10 is coupled to respective in-phase (I) and quadrature phase (Q) channel mixers 11 and 13, which multiply the incoming signal by relative phase quadrature reference frequency signals generated by a voltage controlled local oscillator (VCO) 15 and an associated 90° phase shifter 17, so as to produce down-converted (baseband) I and Q channel signals.

The down-converted (baseband) I and Q channel signals output by mixers 11, 13 are digitized by an analog-to-digital converter 21 and then despread by a correlator 23. The respective despread baseband I' and Q' channels output by the correlator 23 are coupled over respective multibit links 31 and 32 to digitally implemented phase error detection logic circuitry 33, which outputs a digital vector (code) representative of the (carrier frequency offset associated) phase error in the downconverted signals. This phase error code is coupled through a digital loop filter 35 to a digital-to-analog converter (DAC) 37, which converts the phase error code into an analog voltage for adjusting the output frequency of the VCO 15.

Because oscillator circuits of the type used in the carrier tracking stage of FIG. 1 employ analog components (VCO 15), they suffer from a number of deficiencies. For example, their output frequencies will vary with environmental conditions, such as time (aging) and temperature, as well as with other less influential factors. In addition, component-to-component manufacturing tolerances of these parts are satisfactory only within a prescribed range—usually specified in the hundreds of parts per million (ppm). Further, compared to other components in the radio, oscillators are relatively expensive and prone to mechanical failure.

Due to the inherent inaccuracies in oscillator components of a radio receiver prevent data from being perfectly demodulated and delivered to downstream baseband processing circuitry with precise replication, compensation circuitry must be incorporated into the radio's timing recovery and data demodulation signal processing stages. These circuits traditionally utilize additional voltage controlled oscillator components, which are tuned to frequencies such that the inaccuracies of the crystal and voltage controlled oscillator components used in each of the transmitter and receiver portions of the radio can be effectively eliminated on a long term averaged basis. Unfortunately, employing a voltage controlled oscillator in the compensation circuit introduces yet another level of inaccuracy, and adds to the cost of the overall radio design.

SUMMARY OF THE INVENTION

In accordance with the present invention, the above described shortcomings of conventional analog voltage controlled oscillator-based radio systems are effectively obviated by a new and improved digital-based data demodulator architecture, that employs a cordic rotator-based digital phase locked loop for carrier frequency tracking, and thereby removes the voltage controlled oscillator and its associated problems from the phase locked loop. In a demodulator application, a received signal, such as a spread spectrum-modulated BPSK signal, is multiplied in respective in-phase (I) and quadrature phase (Q) channel mixers by relative phase quadrature reference frequency signals produced by a fixed frequency (e.g., crystal) oscillator and an associated 90° phase shifter to produce down-converted (baseband) I and Q channels.

The I and Q channels are digitized and then despread by a correlator. The respective despread baseband I and Q channels are coupled to respective inputs of a digital cordic rotator, which executes iterative phase-rotational adjustments of its digitized in-phase and quadrature inputs, in accordance with a phase angle vector code generated by digital phase error detection logic circuitry to which the rotated I and Q outputs of the cordic rotator are applied. The phase error representative code vector is coupled through a digital loop filter as a reference angle input to the cordic rotator. The cordic rotator iteratively rotates the I and Q channel values over a prescribed number of processing cycles.

Pursuant to a preferred embodiment, the cordic rotator includes a quadrant adjustment section upstream of respective I and Q channel rotation iteration loops, and a phase angle quadrant adjustment section upstream of a phase angle iteration loop. Each iteration through the pipeline signal processing paths for the respective I channel and Q channel rotation iteration loops and a phase angle iteration loop comprises four quarter cycles. The quadrant adjustment section is used at initialization to perform a quadrant adjustment of the I and Q input values, based upon the sign of the angle of rotation θ supplied from the digital loop filter. In association with initialization of the I and Q channels, a phase angle quadrant adjustment section performs an offset correction of the vector code value of the angle of rotation θ, in accordance with whether the phase angle code vector falls within a prescribed window.

During the first subportion (quarter cycle) of a respective iteration, quadrant-adjusted IP and QP values are latched into associated I and Q registers, an incremental angle control code associated with the arctan of an iteration-defined power of one-half is generated, and the current value of iterated phase angle value is latched in an updated phase angle or β register. During a second quarter cycle, the respective values of the I and Q vectors are divided by two, by associated right-shift logic circuits and the results are multiplied by the most significant bit of the phase angle code β to produce delta I and Q codes. Also a delta phase angle value based upon the incremental angle code is stored.

During the third quarter cycle, an updated phase angle value corresponding to the sum of the delta phase angle value and the updated phase angle β is generated and latched. Also the delta I and Q codes produced during the second quarter cycle are summed with the previous I and Q values to produce updated I and Q codes, respectively. In the fourth cycle, the updated I and Q codes are latched, thus completing one iteration.

This process is repeated for K iterations (with the exception of the initialization operations carried out by the quadrant adjustment section for the I and Q loops and the phase angle quadrant adjustment section for the phase angle loop). In the fourth quarter cycle of the Kth iteration, the adjusted values of the I and Q channel codes are latched into output registers to provide respective 'cordic-rotated' I and Q channel output values.

DETAILED DESCRIPTION

Figure 1:
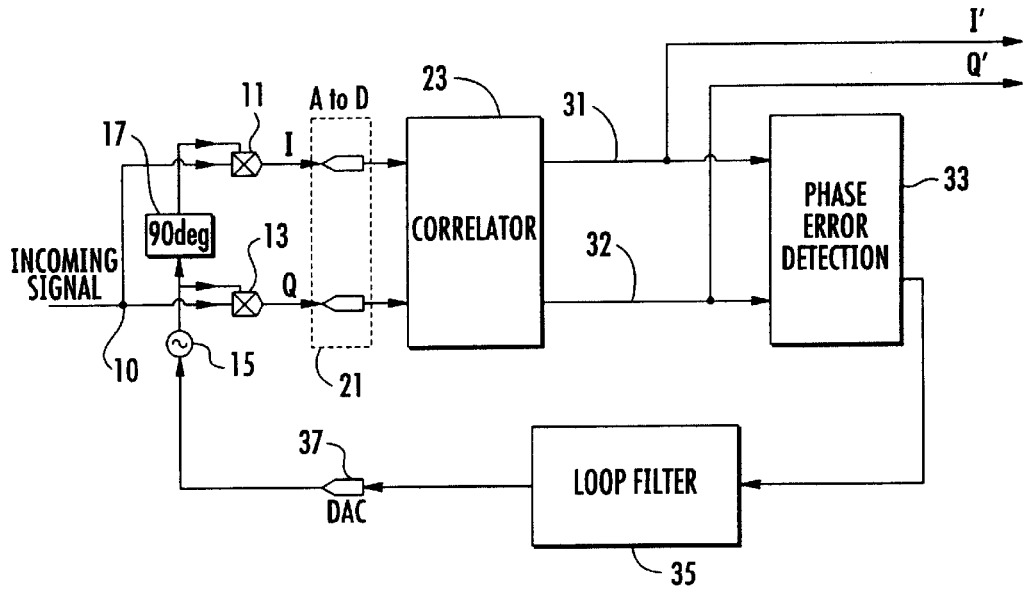
FIG. 1 diagrammatically illustrates a phase locked loop for a demodulation stage of a conventional digital radio.

Before describing in detail the new and improved cordic rotator-based digital phase locked loop of the present invention, it should be observed that the invention resides primarily in what is effectively a modular arrangement of conventional communication signaling hardware and signal processing components and attendant supervisory communications microprocessor circuitry and application software therefor, that controls the operations of such components. In a practical implementation that facilitates their incorporation into wireless telecommunication equipment, such as but not limited to a spread spectrum microwave (T1) radio, these modular arrangements may be implemented as field programmable gate array (FPGA) and/or application specific integrated circuits (ASICs). In terms of a practical hardware implementation, to be described, digital ASICs are preferred.

Consequently, the configuration of such circuits and components and the manner in which they are interfaced with associated radio communication subsystems have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to show the major components of a demodulator employing the cordic rotator-based phase locked loop in a convenient functional grouping, whereby the present invention may be more readily understood.

Figure 2:
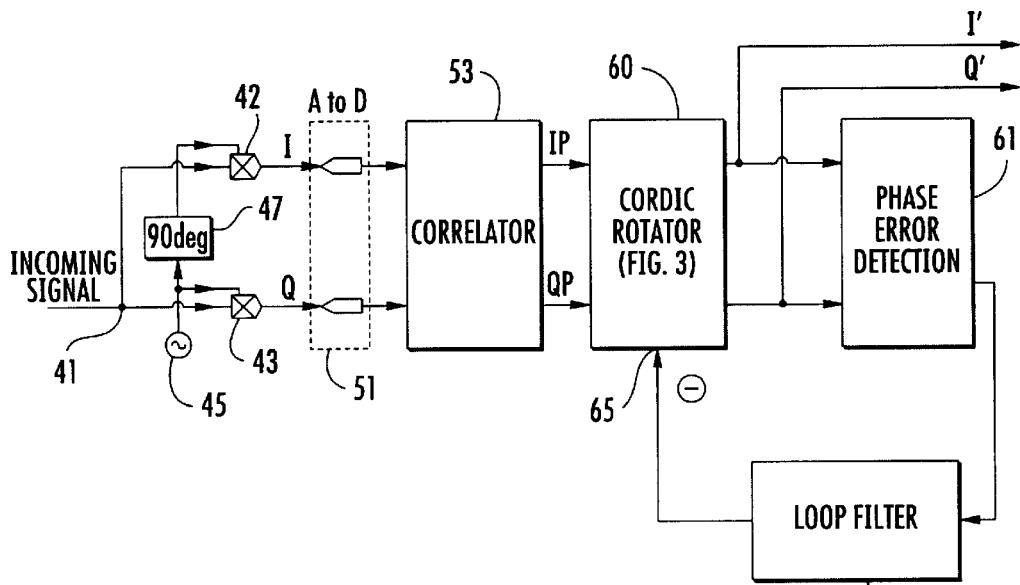
FIG. 2 diagrammatically illustrates the overall architecture of a demodulator employing a cordic rotator-based digital phase locked loop in accordance with an embodiment of the invention.

The overall architecture of a demodulator employing a cordic rotator-based digital phase locked loop in accordance with a non-limiting, but preferred, embodiment of the invention is diagrammatically illustrated in FIG. 2 as comprising an input port 41, to which an incoming signal, such as a spread spectrum-modulated BPSK signal used to transport T1 digital communication channels is applied. As in the conventional architecture of FIG. 1, the input port 41 is coupled to respective in-phase (I) and quadrature phase (Q) channel mixers 42 and 43, which multiply the incoming signal by relative phase quadrature reference frequency signals generated by a local oscillator (VCO) 45 and an associated 900 phase shifter 47, to produce a pair of down-converted (baseband) I and Q channel signals. Unlike the architecture of FIG. 1, however, local oscillator 45, rather than being a voltage controlled oscillator, is a fixed frequency device, such as a relatively inexpensive crystal oscillator, that readily lends itself to use in a consumer oriented product.

The down-converted (baseband) I and Q channel signals output by respective mixers 42 and 43 are digitized by an analog-to-digital converter 51 and then despread by a correlator 53. The respective baseband digital I and Q channels as despread by the correlator 53 are coupled to respective IP and QP inputs of a cordic rotator 60 (shown in detail in FIG. 3 to be described). As pointed out briefly above, the cordic rotator 60 is operative to execute iterative frequency adjustments of its digitized in-phase and quadrature inputs IP and QP, in accordance with a phase angle vector code generated by digital phase error detection logic circuitry 61, as representative of the carrier frequency offset associated phase error in the phase-corrected digital codes I' and Q'. This phase error representative code vector is coupled through a digital loop filter 63 as a reference angle input 65 to the cordic rotator 60, which adjusts the phase-corrected codes I' and Q' over a prescribed number of processing cycles, so as to incrementally refine the resolution to which the Cartesian components IP an QP are corrected.

Figure 3A:
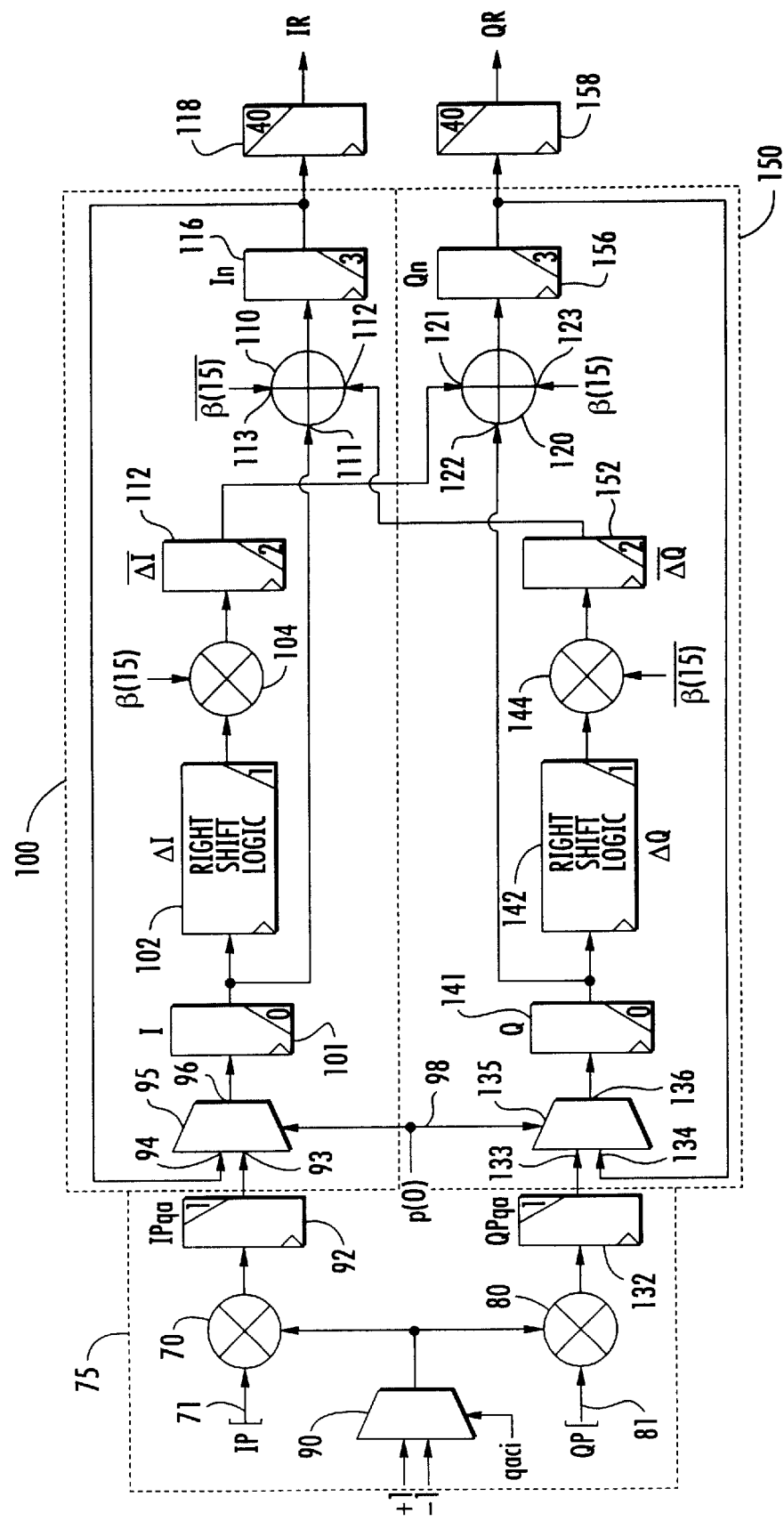
FIGS. 3A and 3B diagrammatically illustrate an embodiment of the digital logic architecture of a cordic rotator that may be employed in the phase locked loop of FIG. 2.
Figure 3B:
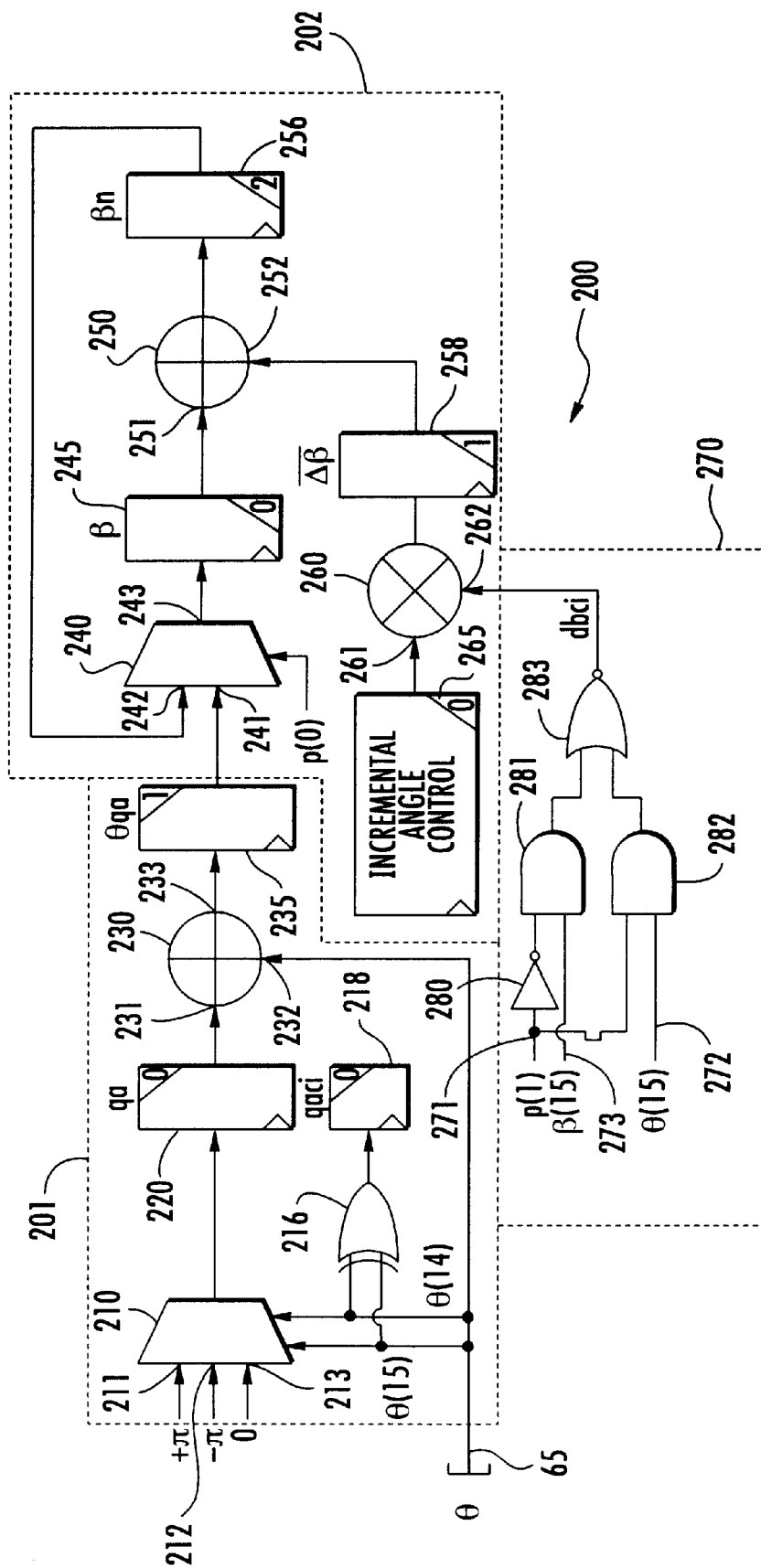

Referring now to FIGS. 3A and 3B, a non-limiting, but preferred embodiment of the digital logic architecture of a cordic rotator that may be employed in the phase locked loop of FIG. 2 is diagrammatically illustrated as comprising input ports 71 and 81, which are coupled to receive the (Cartesian) IP and QP code vectors output by the despreading correlator 53 for the respective I and Q channels. The I channel's input port 71 is coupled to a first input of a 'quadrant adjustment (qa)' multiplier 70 of a quadrant adjustment section 75 upstream of respective channel and Q channel rotation iteration loops 100 and 150. The qa multiplier 70 has a second input coupled to the output of a qa value multiplexer 90. Similarly, the Q channel's input port 81 is coupled to a first input of a qa multiplier 80, which has a second input coupled to the output of the qa multiplexer 90.

The qa multiplexer 90, in association with qa multipliers 70 and 80, is used at initialization to perform a quadrant adjustment of the IP and QP values (based upon the sign of the angle of rotation θ supplied to the reference angle input 65 from the digital loop filter 63). This quadrant adjustment is effected by selectively supplying one of a pair of pre-scribed digital code values (e.g., +1, −1) to each of the qa multipliers 70 and 80, in accordance with the logical state of a quadrature adjustment carry input (qaci) to its select input from a qaci register 218 of a phase angle logic circuit 200, to be described. The quadrant adjustment section 75 further includes an IPqa register 92, into which the output of quadrant adjusted IP value produced by multiplier 70 is clocked during initialization mode (by a clock signal sourced from a state machine running in the loop's supervisory microcontroller, not shown). Similarly, for the Q channel path a QPqa register 132 stores the output of the Q channel multiplier 80.

The quadrant-adjusted IP value stored in the IPqa register 92 is coupled as a first input 93 of an iteration input multiplexer 95 at the upstream end of IP rotation iteration loop 100. Similarly, the quadrant adjusted QP value stored in the QPqa register 132 are coupled as a first input 133 of a multiplexer 135, at the upstream end of QP rotation iteration loop 150. As will be described, each I and Q rotation iteration loop is operative to iteratively adjust values of the IP and QP Cartesian vectors to accumulated values that reduce the value of the phase angle θ to zero.

For purposes of providing a non-limiting example, the code widths of the IP, QP and θ values may be sixteen bits, and ten iterations may be employed. Also, in the pipeline signal processing paths through the respective I channel and Q channel rotation iteration loops as well as a phase angle iteration loop, each pipeline stage may comprise four quarter cycles 0, 1, 2, 3, so that for ten iterations a total of forty quarter cycles are executed. It should be observed, however, that the cordic rotator architecture and signal processing flow described herein are not limited to these are any other set of parameters. In the embodiment of FIG. 3, the particular quarter cycle associated with the For purposes of providing a non-limiting example, the code widths of the IP, QP and θ values may be sixteen bits, and ten iterations may be employed. Also, in the pipeline signal processing paths through the respective I channel and Q channel rotation iteration loops as well as a phase angle iteration loop, each pipeline stage may comprise four quarter cycles 0, 1, 2, 3, so that for ten iterations a total of forty quarter cycles are executed. It should be observed, however, that the cordic rotator architecture and signal processing flow described herein are not limited to these are any other set of parameters. In the embodiment of FIGS. 3A and 3B, the particular quarter cycle associated with the clocking of a respective component within each rotation iteration loop is denoted in the lower right hand corner of the component. Thus, for example, the clocking of an I register 101 in loop 100 is shown as associated with the first quarter cycle (0).

Within I channel loop 100, iteration input multiplexer 95 has a second input 94 derived from a downstream I-next (In) register 116. That one of the two inputs 93 and 94 to iteration input multiplexer 95 which is coupled to its output 96 is defined in accordance with the state of an initial pipeline stage p(0) select line 98 from the state machine running in the cordic rotator's supervisory microcontroller. At the beginning of each iteration sequence, the initial pipeline stage p(0) select line 98 has a first logic value that couples input 93 to the multiplexer output, and thereby couples the quadrant-adjusted IP value stored in the IPqa register 92 to the output of the multiplexer 95. For the remaining iterations of a given sequence, the initial pipeline stage p(0) select line 98 has a second logic value that couples multiplexer input 94 to its output, and thereby couples the updated IP value stored in register 116 to the output of multiplexer 95.

The output 96 of the iteration input multiplexer 95 is buffered in an I register 101 and applied to a differential or 'delta I' right-shift (divide-by-two) logic circuit 102, and to a first input 111 of an adder 110. During the second quarter cycle (1) of each iteration through the pipelined rotational adjustment of the IP value, the right-shift logic circuit 102 performs a divide-by-two operation on the current value of the I vector stored in the I register 101.

The output of the divide-by-two logic circuit 102 is coupled to a first input of a sign multiplier 104, a second input of which is coupled to receive the sign or most significant bit (e.g. bit 15) of the current value of a (sixteen bit) phase angle (θ) code supplied from phase angle logic circuit 200. During the third quarter cycle (2) of each iteration, the resulting value is clocked into a delta I register 112, the stored content of which is coupled to a first input 121 of an adder 120 in the Q channel path. Adder 110 has a second input 112 coupled to a delta Q register 152 in the Q channel loop, and a third input 113 coupled to receive the complement of the most significant bit value β(15) of the phase angle code stored in an update phase angle or 'β' register 245 in the phase angle logic circuit 200, as will be described.

During the fourth quarter cycle (3) of each iteration, the output of the I channel adder 110 is clocked into and buffered in (In) register 116, the output of which is coupled to the second input 94 of multiplexer 95, as described above, and to an IR output register 118. The adjusted value of the I channel code stored in register 116 is not clocked into the IR output register 118 until the fourth quarter cycle of the last or tenth iteration (shown as quarter cycle (40)).

For the Q channel loop 150, the bit contents of the QPqa register 132 are coupled as a first input 133 of Q multiplexer 135, having a second input 134 coupled to downstream (Qn) register 156. One of the two inputs 133 and 134 to multiplexer 135 is coupled to its output 136 in accordance with the state of the p(0) pipeline stage select line 98 from the state machine, as described above for the I channel path. During the first quarter cycle (0) of a respective iteration, the output 136 of the multiplexer 135 is buffered in a register 141. During a second quarter cycle (1) of a respective iteration the contents of register 141 are coupled into a delta right-shift (divide-by-two) logic circuit 142, and to a second input 122 of adder 120 in the I channel path. The divide-by-two logic circuit 142 is coupled to a first input of a multiplier 144, a second input of which is coupled to receive the complement of the most significant bit (e.g. bit 15) of the (sixteen bit) phase angle code supplied from phase angle logic circuit 200. At the third quarter cycle (2) of each iteration, the output of multiplier 144 is clocked into a delta Q register 152, the stored contents of which are coupled to the second input 112 of adder 110 in the I channel path, as described above. Adder 120 has a third input 123 coupled to receive the most significant bit value β(15) of the phase angle code stored in a β register 245 in the phase angle logic circuit 200. At the fourth quarter cycle (3) of each iteration, the output of the Q channel adder 120 is clocked into and buffered in a Q-next (Qn) register 156, the output of which is coupled to the second input 134 of multiplexer 135, as described above, and to a QR output register 158. The updated value of the Q channel code stored in Qn register 156 is clocked into the QR output register 158 at the fourth quarter cycle of the last or tenth iteration (shown as quarter cycle (40)) of the updating sequence.

The phase angle logic circuit 200 is shown as including a phase angle quadrant adjustment section 201 to which the (sixteen bit) phase error representative code vector θ on line 65 from the digital loop filter 63 is supplied, as described above. The phase angle quadrant adjustment section 201 is employed at initialization to perform a preliminary offset correction of the vector code value of the angle of rotation θ, as necessary, to conform with the parametric range of operation of the cordic rotator.

For this purpose, the two most significant bits (e.g., bits θ(14) and θ(15) in the present example) are used to provide steering control for a three input 'initialization angle correction' multiplexer 210. The two most significant bits of the phase angle input code on line 65 are also coupled to an exclusive-OR circuit 216, the output of which is stored in a qaci register 218. The bit stored in qaci register 218 serves as the steering control input to qa multiplexer 90, as described above.

The initialization angle correction multiplexer 210 has a first input 211 coupled to receive a first reference angle of +180°, a second input 212 coupled to receive a second reference angle of −180°, and a third input 213 coupled to receive a third reference angle of 0°. One of the three inputs to multiplexer 210 is coupled to its output in accordance with whether the phase angle code vector θ falls within a prescribed window or range (e.g., ±π/2 as determined by the logic values of bits θ(14) and θ(15)).

If the phase angle code vector θ is greater than ±π/2, multiplexer 210 steers the value of −π to its output. If the phase angle code vector θ is less than −π/2, multiplexer 210 steers the value of +π to its output. Otherwise, multiplexer 210 steers the value of 0 to its output. The output of multiplexer 210 is clocked into a qa register 220, the contents of which are applied as a first input 231 of an adder 230, a second input 232 of which is coupled to the phase angle error code line 65. The output 233 of adder 230, which is an initially 'corrected' phase angle value, is clocked into a θqa register 235, the bit contents of which are coupled to a first input 241 of a front end multiplexer 240 of phase angle iteration loop 202. Multiplexer 240 has a second input 242 coupled to a downstream β-next (βn) register 256.

A selected one of the two inputs 241 and 242 to the phase angle iteration loop's front end multiplexer 240 is coupled to its output 243 in accordance with the state of the p(0) pipeline stage select line 98 from the state machine. During the first quarter cycle (0) of a respective iteration, the output 243 of multiplexer 240 is buffered in a β register 245 and applied to a first input 251 of an adder 250. A second input 252 of adder 250 is coupled to a (delta β) register 258, which stores the product produced by a multiplier 260 during a second quarter cycle (1) of a respective iteration. During a third quarter cycle (2) of a respective iteration, the output of adder 250 is buffered in βn register 256. The contents of βn register 256 are coupled to the second input 242 of multiplexer 240, as described above.

Multiplier 260 has a first input 261 coupled to receive an incremental angle control code supplied by an incremental angle control code generator 265. Generator 265 may comprise gate array logic circuitry or a state machine that is operative to output successive arctan values of powers of 1/2, in association with the iterative right shift (divide-by-two) operations carried out by divide-by-two logic circuit 102 during successive cycles of iterative rotation of the quadrant adjusted I and Q values processed by the loop 100. A second input 262 of multiplier 260 is coupled to receive a dbci bit from a control logic circuit 270.

Control Logic circuit 270 has a first input 271 coupled to receive a first pipeline stage bit p(1), which is coupled through an inverter 280 to a first input of an AND gate 281 and to a first input of an AND gate 282, the output of which is coupled to a first input of a NOR circuit 283. Control logic circuit 270 has a second input 272 coupled to receive the most significant bit value β(15) of the (sixteen bit) phase angle code stored in β register 245. A second input of AND gate 282 is coupled to receive the most significant bit θ(15) of the (16 bit) phase angle code θ on line 65. The output of AND gate 281 is coupled as a second input to NOR circuit 283.

The Boolean operation of logic circuit 270 is such that the NOR circuit 283 supplies the most significant bit value θ(15) as the dbci value to the second input 262 of multiplier 260 only at initialization. Thereafter, during successive iterations of the cordic rotator, the dbci value to multiplier 260 from NOR circuit 283 is most significant bit value β(15) of the current value of 62 stored in β register 245, so that the incremental modification of the currently accumulated value of the phase angle stored in βn register 256 will track each iterative divide-by-two operation performed in the I and Q channels of loop 100.

In operation, at initialization for a new set of I channel and Q channel code vectors output by the despreading correlator 53 to input ports 71 and 81, the IP and QP input values are multiplied in quadrant adjustment multipliers 70 and 80 by one of the two quadrant adjustment values (+1, −1) supplied to multiplexer 90, and the resulting products are stored in the respective IPqa and QPqa registers 92 and 132. As noted above, the quadrant adjustment values are selected by the state of the quadrature adjustment carry input (qaci) bit supplied from qaci register 218 of the phase angle logic circuit 200, in accordance with the two most significant bits of the phase angle input code on line 65 and applied to exclusive-OR circuit 216.

In association with initialization of the I and Q channels, the phase angle quadrant adjustment section performs the above-described offset correction of the vector code value of the angle of rotation θ, based upon the two most significant bits of that phase angle vector code. The resulting offset phase angle code value is obtained by summing (in adder 230) the offset value latched into qa register 220 from multiplexer 210, during the first quarter cycle (0) of a first iteration (J=0), with the original phase angle code vector value θ. During the same (first quarter) cycle, within the I and Q channels, the quadrant-adjusted IP and QP values stored in the respective IPqa and QPqa registers 92 and 132 are coupled through their associated multiplexers 95 and 135 and latched into I and Q registers 101, 141.

During the second quarter cycle (1), within the phase angle logic circuit 200, the initially 'corrected' phase angle value at the output of adder 230 is clocked into θqa register 235, and applied through multiplexer 240 to β register 245. In addition, the product output of multiplier 260 resulting from multiplying the arctan of the current iteration (J) of the value of $1/2^J$ by the dbci bit value is latched into the register 258. Within the I and Q loops, the respective values of the I and Q vectors are divided by two by the right-shift logic circuits 102, 142, and the results are multiplied in multipliers 104, 144 by the most significant bit of the phase angle code β stored in the register 245 of the phase angle logic circuit 200.

During the third quarter cycle (2), within the phase angle logic circuit 200, the summation value output by adder 250 (representative of an updated or 'next' value of β) is latched into βn register 256. Within the I and Q channel loops, the outputs of multipliers 104, 144 are latched into respective registers 112, 142, for application to adders 140, 110. In the fourth quarter cycle (3), the outputs of the I and Q channel adders 110, 140 respectively are clocked into In and Qn registers 116, 146.

Except for the initialization operations carried out by the quadrant adjustment section 75 for the I and Q loops and the phase angle quadrant adjustment section 201 for the phase angle loop 200, the above operations are repeated for the second (J=1) through Kth (K=9 in the present example of a ten iteration sequence) iteration. In the fourth quarter cycle of the tenth iteration (shown as quarter cycle (40)), the adjusted values of the I and Q channel codes stored in respective registers 116 and 146 are into their associated output registers 118, 148 to provide respective 'cordic-rotated' IR and QR output values.

As will be appreciated from the foregoing description, the shortcomings of conventional analog voltage controlled oscillator-based radio systems are effectively obviated by the cordic rotator-based digital phase locked loop of the present invention, which eliminates the need for a voltage controlled oscillator and its attendant problems. Advantageously, the digital cordic rotator architecture employs essentially add and subtraction operations, and performs divisions by a shift operation, thereby simplifying its digital implementation. This not only reduces the sources of noise (including leakage), but reduces the number of components to the extent that the cost of the digital logic for the cordic rotator is considerably less than that associated with conventional components (multipliers and voltage controlled oscillators).

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A demodulator comprising:

an input port to which an input signal containing an encoded information signal modulated onto a carrier frequency is applied;

a frequency converter coupled to receive said input signal and a fixed frequency signal proximate said carrier frequency and being operative to produce a frequency converted signal containing said encoded information signal; and a frequency error correction loop coupled to process said frequency converted signal to produce a corrected frequency converted signal, and including a cordic rotator to which said frequency converted signal is coupled, and from which said corrected frequency converted signal is output via an output port to downstream baseband processing circuitry for recovering said information signal, a phase error detector coupled to the output of said cordic rotator and being operative to detect phase error in the output of said cordic rotator associated with a departure of said fixed frequency signal from said carrier frequency, and a loop filter coupled to the output of said phase detector and through which a phase error signal generated by said phase error detector is coupled to said cordic rotator for controlling the operation thereof; and wherein said output port from which said corrected frequency converted signal output by said cordic rotator is derived for application to said downstream baseband processing circuitry for recovering said information signal is coupled to the output of said cordic rotator of said frequency error correction loop, and further including a digitizer which is operative to digitize said frequency converted signal produced by said frequency converter, and wherein said frequency error correction loop comprises a digital frequency error correction loop, and wherein said input signal contains in-phase and quadrature components, and wherein said cordic rotator is operative to perform iterative adjustments of digitized in-phase and quadrature components of said frequency converted signal to reduce said phase error detected by said phase error detector, and wherein said cordic rotator is operative to iteratively rotate digitized in-phase and quadrature components of said frequency converted signal in accordance with a phase angle vector associated with said phase error detected by said phase error detector, and wherein said cordic rotator is operative to iteratively adjust said digitized in-phase and quadrature components of said frequency converted signal in association with an iterative modification of said phase angle vector in a phase angle iteration loop to which said phase error signal generated by said phase error detector is coupled, over a prescribed number of processing cycles, and wherein said cordic rotator includes a quadrant adjustment section upstream of I and Q channel rotation iteration loops, and a phase angle adjustment section upstream of a phase angle iteration loop, said I and Q channel rotation iteration loops being operative to iteratively rotate respective quadrant adjusted values of said digitized in-phase and quadrature components of said frequency converted signal to values associated with said phase angle iteration loop iteratively reducing an adjusted value of said phase angle vector to a minimum value.

2. A method of demodulating a modulated signal containing an encoded information signal modulated onto a carrier frequency comprising the steps of:

(a) processing said modulated signal in accordance with a fixed frequency signal proximate said carrier frequency to produce a frequency converted signal containing said information signal, (b) applying said frequency converted signal to a frequency error correction loop that is operative to output a corrected frequency converted signal, said frequency error correction loop including a cordic rotator to which said frequency converted signal is coupled, and from which said corrected frequency converted signal is output via an output port to downstream baseband processing circuitry for recovering said information signal, a phase error detector coupled to the output of said cordic rotator and being operative to detect phase error in the output of said cordic rotator associated with a departure of said fixed frequency signal from said carrier frequency, and a loop filter coupled to the output of said phase detector and through which a phase error signal generated by said phase error detector is coupled to said cordic rotator for controlling the operation thereof, and wherein said output port from which said corrected frequency converted signal output by said cordic rotator is derived for application to said downstream baseband processing circuitry for recovering said information signal is coupled to the output of said cordic rotator of said frequency error correction loop, and wherein step (b) includes digitizing said frequency converted signal, and wherein said frequency error correction loop comprises a digital frequency error correction loop, and wherein said modulated signal contains in-phase and quadrature components, and wherein said cordic rotator is operative to perform iterative adjustments of digitized in-phase and quadrature components of said frequency converted signal to reduce said phase error detected by said phase error detector, and wherein said cordic rotator is operative to iteratively rotate said digitized in-phase and quadrature components of said frequency converted signal in accordance with a phase angle vector associated with said phase error detected by said phase error detector, and wherein said cordic rotator is operative to iteratively digitally rotate said digitized in-phase and quadrature components of said frequency converted signal over a prescribed number of processing cycles, so as to incrementally refine the resolution to which said frequency converted signal is corrected by said cordic rotator, and wherein said cordic rotator is operative to iteratively adjust said digitized in-phase and quadrature components of said frequency converted signal in association with an iterative modification of said phase angle vector in a phase angle iteration loop to which said phase error signal generated by said phase error detector is coupled, over a prescribed number of processing cycles, and wherein said cordic rotator includes a quadrant adjustment section upstream of I and Q channel rotation iteration loops, and a phase angle adjustment section upstream of a phase angle iteration loop, said 1 and Q channel rotation iteration loops being operative to iteratively rotate respective quadrant adjusted values of said digitized in-phase and quadrature components of said frequency converted signal to values associated with said phase angle iteration loop iteratively reducing an adjusted value of said phase angle vector to a minimum value.

\* \* \* \* \*

UNITED STATES PATENT AND TRADEMARK OFFICE
CERTIFICATE OF CORRECTION

PATENT NO. : 6,771,715 B1
DATED : August 3, 2004
INVENTOR(S) : Eric M. Rives, Matthew F. Gann and Anthony A. Goodloe It is certified that error appears in the above-identified patent and that said Letters Patent is hereby corrected as shown below:

Column 4,
Line 5, delete "900" insert -- $90°$ --

Column 7,
Line 8, delete "$\pm\pi/2$," insert -- $+\pi/2$, --
Line 65, delete "62" insert -- $\beta$ --

Column 10,
Line 29, delete "," insert -- ; --

Signed and Sealed this

First Day of February, 2005

JON W. DUDAS
*Director of the United States Patent and Trademark Office*